Sept. 23, 1969    C. F. HAUTAU    3,468,199
CONVERSION OF SHEET MATERIAL INTO SMALLER PIECES
Filed Feb. 6, 1967    3 Sheets-Sheet 1
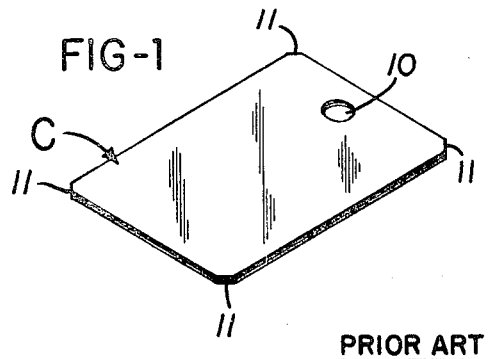
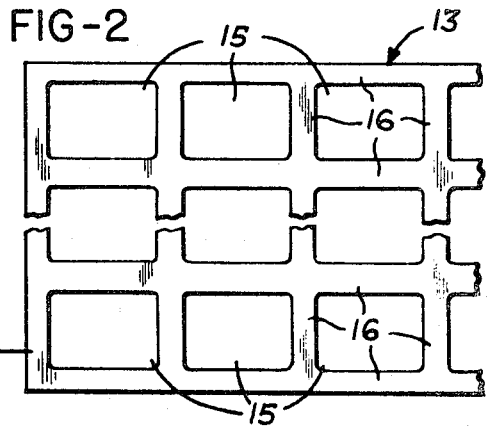
PRIOR ART
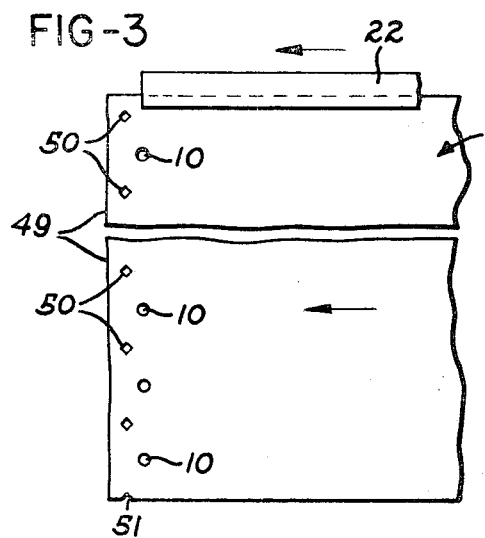
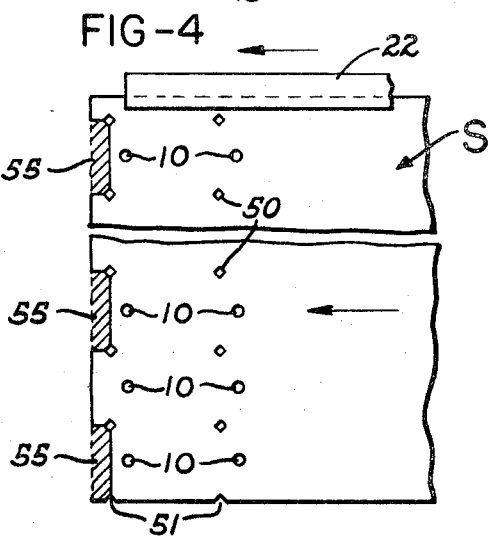
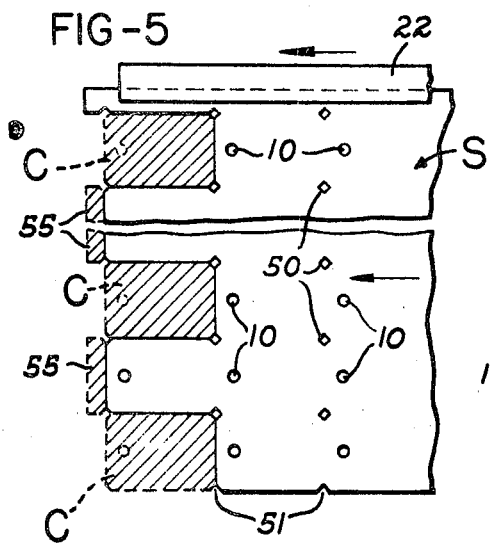
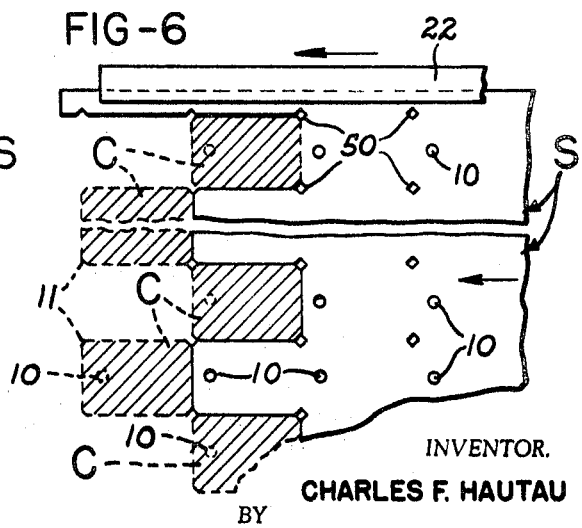
INVENTOR.
CHARLES F. HAUTAU
BY
Marechal, Biebel, French & Bugg
ATTORNEYS Sept. 23, 1969  C. F. HAUTAU  3,468,199
CONVERSION OF SHEET MATERIAL INTO SMALLER PIECES
Filed Feb. 6, 1967  3 Sheets-Sheet 2
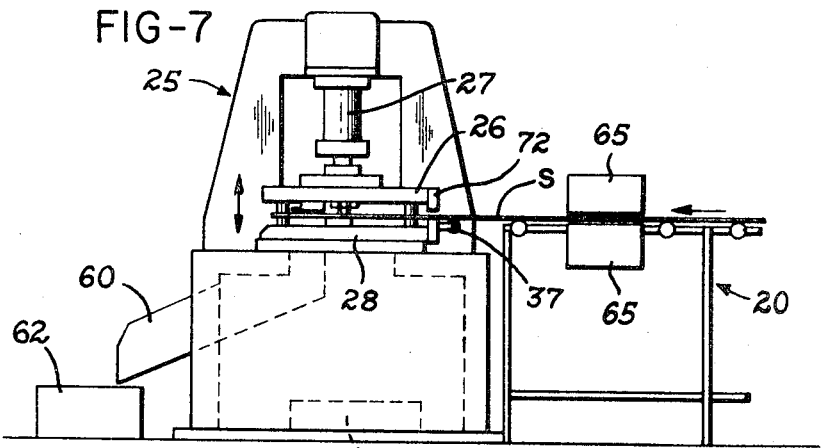
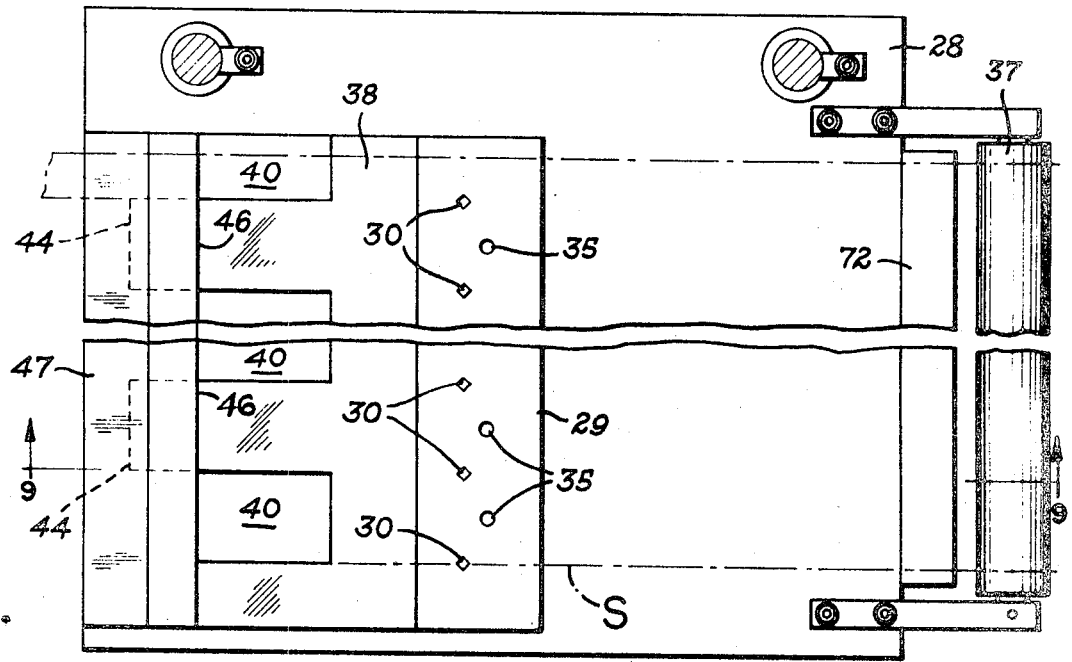
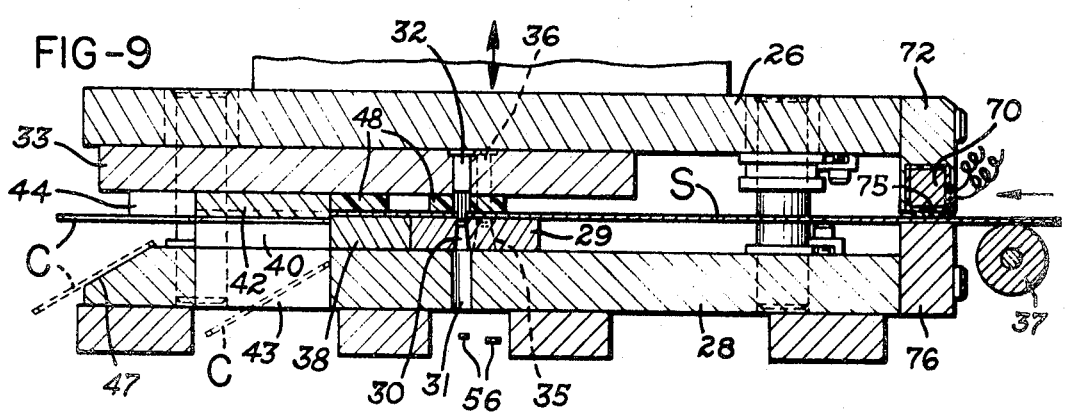

United States Patent Office 3,468,199
Patented Sept. 23, 1969

3,468,199
CONVERSION OF SHEET MATERIAL INTO SMALLER PIECES
Charles F. Hautau, Oxford, Ohio, assignor to The Black Clawson Company, Hamilton, Ohio, a corporation of Ohio
Filed Feb. 6, 1967, Ser. No. 614,271
Int. Cl. B26d 3/00, 7/00
U.S. Cl. 83—15                                5 Claims

ABSTRACT OF THE DISCLOSURE

Process for efficiently converting a sheet of material directly into smaller pieces of predetermined size by progressively shearing the sheet along laterally and longitudinally extending lines alternately connected to form a series of notches along the leading edge portion of the sheet with each notch conforming to the configuration of a piece.

Background of the invention

In advertising, marketing and promoting decorative plastic laminates, it is common for the manufacturers of such laminates to distribute packs of sample chips or plaques with each chip representing an available pattern. Frequently the sample chips are collected on a key chain to form the packs so that each pattern may be conveniently inspected by a prospective customer. It is not uncommon for a manufacturer of decorative laminates to distribute several hundred thousand packs during a year with each pack usually containing over fifty sample chips.

One method employed for forming sample chips is to shear a large sheet, as for example, a four by eight or five by twelve foot sheet, into longitudinal strips and then to shear each strip laterally at successive spaced intervals. This method, however, produces chips having undesirably sharp square corners and requires a substantial number of shearing presses and operations to produce the high volume of sample chips required.

Another method of forming sample chips is to employ a mechanical or hydraulic press and a die set having a plurality of blanking dies which form simultaneously a plurality of sample chips with each stroke of the press. While the use of blanking dies enables the production of chips having rounded corners, it has been found that substantial space must be provided between adjacent blanking dies to prevent splitting or fracturing of the sample chips along the edges and at the corners. Furthermore, it has been found necessary to pre-heat the decorative laminate sheets to a temperature on the order of 185° F. immediately before blanking to aid in preventing the chips from splitting and cracking.

As a result of the spacing between adjacent blanking dies, a perforated scrap sheet or matrix is produced having rows of windows or pockets separated by webs equal to the spacing between the dies, and it is not uncommon for these webs to represent as much as 30 to 50% of the original sheet of material. Thus it becomes readily apparent in view of the millions of sample chips which are made each year, that the latter method of producing chips results in scrapping and wasting a substantial amount of laminate material.

Summary of the invention

The present invention is directed to an improved process and apparatus which is ideally suited for efficiently producing sample chips of decorative laminate material without splitting the edges or corners of the chips. It is to be understood, however, that the process and apparatus of the invention may also be used for converting sheets of other materials into smaller pieces whenever it is desirable to minimize the production of scrap and to provide pieces having precisely formed edges and corners. Furthermore, the term "sheet" as used herein is intended to include not only a flat rectangular sheet, but also a sheet having substantial length such as a web of sheet material extending from a roll or coil.

Thus the invention may be used, for example, for efficiently producing thin wafer-like electrical insulators commonly used in relays, switches and the like, or for producing square floor tile from a large rectangular sheet, or for converting a sheet of thermoplastic material such as nylon into smaller pieces. With the latter material, however, it may be desirable for obtaining smooth distinct edges on the pieces to cool the sheet until it becomes somewhat brittle and then to form the sheet into pieces by use of the process of the present invention.

In accordance with a preferred embodiment of the invention, a sheet of material is converted into small pieces of predetermined size by feeding the sheet in successive steps between a set of die members constructed and operated to shear an edge portion of the sheet along laterally and longitudinally extending lines alternately connected to form a notched leading edge configuration. To convert a sheet of brittle material such as high pressure plastic laminates into small pieces with smooth corners and edges, the sheet is punched before shearing at locations corresponding to the corners of the pieces.

A progressive die set is employed for converting sheets of brittle material, and the corner punches are removable so that they may be replaced without replacing the shearing dies to obtain maximum die life with minimum maintenance expense. Means are also connected to the die set for pre-marking or branding the sheet of material at predetermined locations prior to converting the sheet into smaller pieces to avoid handling and marking of each individual piece formed from the sheet.

Brief description of the drawings

FIG. 1 is a perspective view of a sample chip of decorative laminate illustrating a typical piece formed from a sheet of brittle material by the process and apparatus of the present invention;

FIG. 2 is a plan view of the scrap or matrix portion of a sheet which remains after producing a plurality of chips by a conventional method;

FIG. 3 is a fragmentary plan view of the leading end portion of a sheet of material which has been fed into a progressive die set and showing the results of the first punching operation received in accordance with the invention;

FIG. 4 is a view similar to FIG. 3 showing the first shearing or notching operation received by the leading end portion of the sheet after the sheet is advanced further into the die set;

FIG. 5 is a view similar to FIG. 4 showing the beginning of the forming of full chips after the sheet is advanced by another step into the die set;

FIG. 6 is a view similar to FIG. 5 showing the shearing of full chips from the end portion of the sheet after the sheet is advanced still another step;

FIG. 7 is a diagrammatic elevational view of a hydraulic press showing the feeding of a sheet of material into a progressive die set constructed in accordance with the invention;

FIG. 8 is a plan view of the bottom die plate of the die set shown in FIG. 7;

FIG. 9 is a section of the progressive die set shown in FIG. 7 as generally taken along the line 9—9 of FIG. 8;

Description of the preferred embodiments

Figure 10:
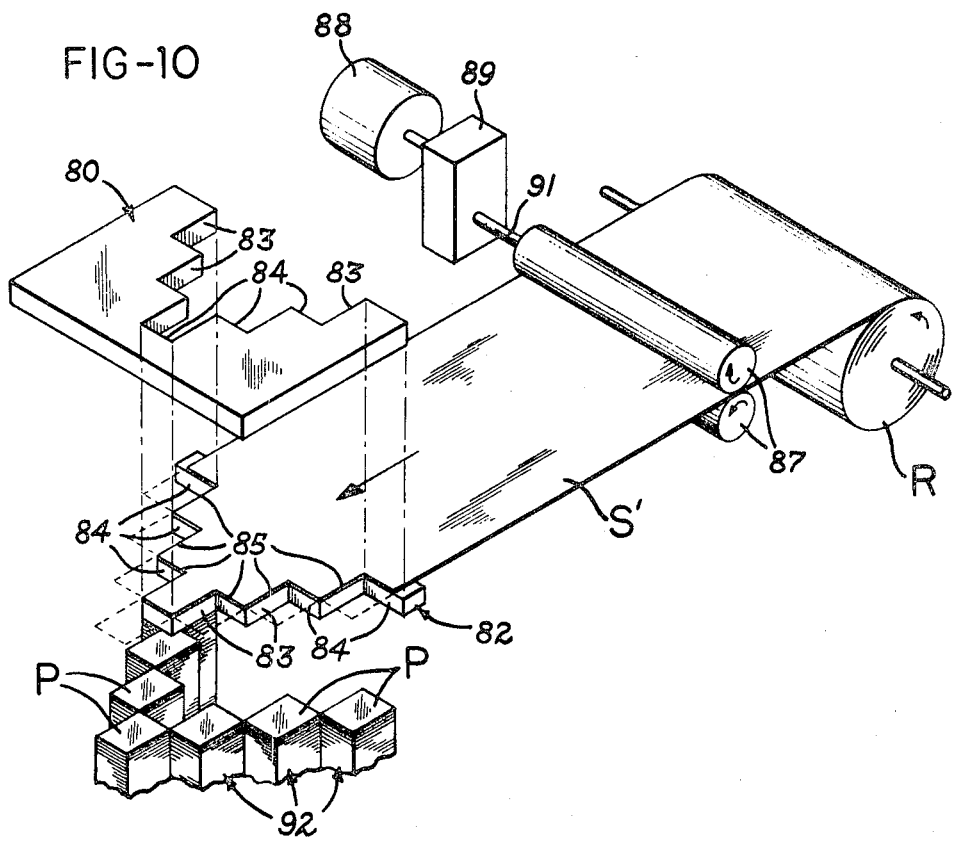
FIG. 10 is a diagrammatic perspective view of apparatus constructed in accordance with another embodiment of the invention.

FIGS. 1–9 show a form of the method and apparatus of the invention which is ideally suited for producing sample chips from a sheet of decorative laminate material. It is to be understood, however, that the process and apparatus may be used for reducing other sheet materials into a plurality of pieces and is not limited to the production of sample chips from a decorative sheet.

As mentioned above, it is common to assemble or collect a number of different sample chips C on a key chain to form a pack with each chip representing one of the different available patterns of the laminate material. For this purpose, each chip C is provided near one end with a small circular hole 10 through which the key chain is threaded. The chips C shown in FIG. 1 is also provided with flat beveled corners 11, but as will be explained later, other corner configurations may be provided by the apparatus of the invention, if desired.

FIG. 2 illustrates a common method of producing sample chips prior to the present invention, wherein a grid-like or matrix scrap portion 13 remains after a sheet of decorative laminate material is blanked progressively by a lateral row of spaced apart blanking dies which leave corresponding rows of pockets or windows 15 separated by laterally and longitudinally extending connecting webs 16. These webs have substantial width to prevent splitting or cracking of the chips at the corners, and as a result, a substantial portion of the sheet material is scrapped. In fact, it has been determined that as much as 30 to 50% of the original sheet of material remains in the form of the webs 16. Thus in view of the extremely high volume of sample chips which are manufactured annually and of the relatively high cost of a sheet of decorative laminate material, it becomes apparent that many thousands of dollars are wasted annually just on the production of sample chips.

In accordance with the present invention, a sheet of brittle material, as for example, a sheet S of high pressure decorative laminate is positioned on a table 20 (FIG. 7) until a side edge portion of the sheet is received within gripping or clamping jaws 22 of a sheet feeding mechanism such as manufactured by the Wiedemann Division of the Warner & Swasey Co. This mechanism grips the side edge portion of the sheet substantially along its entire length, and the corresponding jaws 22 are mounted for reciprocating motion on a rail (not shown) for automatically feeding the sheet S in a step-by-step manner into a hydraulic press 25.

A progressive die set is mounted on the press 25 and includes a top die member or punch plate 26 connected to the pressure cylinder 27 and a bottom die member or plate 28 mounted on the bed of the press. The firm grip by the jaws 22 of the feeding mechanism maintains the sheet S in precise registration in relation to the die set while successively advancing the sheet between the punch plate 26 and the die plate 28 and in timed relation with the actuation of the cylinder 27 or movement of the punch plate 26.

As shown in FIGS. 8 and 9, the bottom die plate 28 supports a hardened steel plate 29 in which are formed a row of laterally spaced square openings 30 aligned with holes 31 formed in the die plate. The openings 30 are adapted to receive the square end portions of corresponding punch inserts 32 projecting downwardly from a plate 33 mounted on a punch plate 26. Also formed within the hardened steel plate 29 is a row of circular openings 35 (FIG. 8) which are adapted to receive corresponding punch inserts 36 projecting from the plate 33 and having end portions of circular cross-section conforming to the opening 35.

Also mounted on the bottom die plate 28 is a guide roller 37 (FIG. 9) and a hardened steel plate 38 in which are formed laterally spaced U-shaped openings 40 (FIGS. 8 and 9) adapted to receive corresponding rectangular shearing punches or dies 42 mounted on the plate 33. The openings 40 are aligned with corresponding rectangular pockets 43 formed within the die plate 28. A series of cutoff or shearing dies 44 are mounted on the plate 33 and are spaced between the dies 42 in shearing relationship with the straight forward edges 46 (FIG. 8) of the plate 38. A laterally extending sloping surface 47 is formed on the forward edge of the bottom die plate 28 under shearing dies 44. Also, packs 48 of resilient material are mounted on the plate 33 surrounding the punch inserts 32 and 36 and around the edges of the dies 42.

When a sheet of laminate material is inserted within the jaws 22 of the feeding mechanism, the leading edge 49 (FIG. 3) of the sheet is positioned at a predetermined distance from the punch inserts 32 so that after the sheet S is advanced onto the plate 29, the punch inserts 32 form a row of square corner holes 50 (FIG. 3) and edge notch 51 within the sheet. As shown in FIG. 3, the first laterally extending row of square openings 50 and edge notch 51 is formed slightly inwardly from the leading edge 49 as this edge is usually rough and irregular and thus is undesirable for using as an edge of a chip.

Simultaneously with the forming of the square holes 50, the punch inserts 36 form a laterally extending row of circular holes 10 (FIG. 3) which are spaced between and slightly to the rear of the adjacent square openings 50. After the sheet S is advanced by another step from the position (FIG. 3) where the leading edge portion of the sheet receives the holes 10 and 50 and the notch 51, the dies 42 shear or punch out alternate scrap pieces 55 (FIG. 4) as the corners of the dies 42 pass through the corresponding openings 50 and thereby form a notch-like end configuration on the sheet S. The scrap pieces 55 sheared from the sheet S fall through the openings 40 and pockets 43 and are collected within a suitable container 58 (FIG. 7) along with the scrap pieces 56 (FIG. 9) produced by punching the openings 15 and 50.

After the sheet is advanced another step by the feeding mechanism, the sheet is sheared along a continuous zig-zag shear line to produce full size chips C as shown in FIG. 5, and the alternate edge scrap pieces 55 are sheared off by the dies 44. As a result, a series of laterally spaced U-shaped notches are formed across the end of the sheet and the square holes 50 formed by the punches 32 produce the beveled corners 11 on the chips C, and the punches 36 produce the circular holes 10 for receiving the key chain.

After the next successive advancement of the sheet S, the entire leading end portion of the sheet is formed into chips C by shearing the sheet along longitudinally and laterally extending lines alternately connecting the corner holes 50 as shown in FIG. 6 with the corresponding shearing dies 42 and 44. The chips C which drop through the pockets 43 and slide off the surface 47 are directed by a chute 60 into a container 62, but suitable magazines may be used to receive the chips and collect them in the form of stacks.

Shearing the chips C from the sheet S in the staggered zig-zag manner as shown in FIG. 6, i.e., along longitudinally and laterally extending lines alternately connecting the holes 50, produces the deep notch-like end configuration across the end of the sheet S, and it can be seen that substantially the entire sheet is converted into chips C with the exception of the narrow edge portion gripped by the jaws 22 and the small scrap pieces 55.

As mentioned above, it has been found desirable to heat the sheet S prior to feeding it into the press 25. For this purpose, heating units 65 (FIG. 7) are mounted on the table 20 and are positioned on opposite sides of the sheet S. Preferably, each unit 65 includes a row of radiant heat lamps extending laterally across the width of the sheet. If radiant cooling is desired, however, the units 65 are replaced by units having large evaporator plates through which a coolant such as Freon is circulated. It is to be understood that other means of heating or cooling may be employed, as for example, oven heating or cooling in a refrigerator.

To produce sample chips similar to the chip C shown in FIG. 1 by the commonly employed process of blanking chips from a sheet and thereby leaving the remaining scrap portion 13 shown in FIG. 2, it has been necessary to heat the laminate material to approximately 185° F. to avoid splitting of the edges and corners of the chip. However, when using the process of the present invention wherein the corner holes are punched before shearing the chips from the sheet, it has been found that the laminate material need be heated only to approximately 165° F. Thus the time and energy required for heating the sheet is significantly reduced.

A branding die 70 is carried by a bar 72 mounted on the receiving end portion of the punch plate 26 and includes a series of electrically heated branding elements 75 which are adapted to engage the sheet S guided over the roller 37 and supported by a backup bar 76. The elements 75 are spaced from the punch inserts 32 at a predetermined distance and are spaced laterally apart corresponding to the size of the chips C to provide each chip with a pattern name and code number. The branding elements 75 could be replaced by other marking elements, but the burning of the name and code number into the sheet has been found to be more permanent and not subjected to smearing. The marking or branding of the sheet S while it is held in registration with the die set by the jaws 22 and prior to shearing it into chips C has been found to save substantial time and effort over the prior method of individually handling and marking each chip after it is blanked.

Referring to FIG. 10, which shows schematically another form of apparatus constructed in accordance with the invention, an upper die member or plate 80 and a lower die member or plate 82 are formed with mating longitudinally extending shearing surfaces 83 and laterally extending shearing surfaces 84 alternately connected at right angles to form a continuous step-like shear line which extends from opposite edge portions of each die plate to its central portion. The die plates thus produce a series of connecting right angle notches 85 within the leading edge portion of a sheet of strip S' extending from a roll or coil R. The strip S' is advanced from the coil in successive steps corresponding to the length of the shearing surfaces 83 and in timed relation with the relative movement between the die plates by a pair of pinch or feed rolls 87. A motor 88 drives the rolls 87 through unit 89 which produces controlled indexing of the output shaft 91 connected to the upper roll 87.

Thus the continuous step-like shear line shown in FIG. 10 forms the leading edge portion of the strip with a series of notches 85 which are arranged symmetrically about the longitudinal centerline of the strip S' and produce a generally V-shaped or pointed end configuration on the strip. The rectangular panels or pieces P which are successively sheared from the strip S' are collected in corresponding magazines (not shown) to form a corresponding series of stacks 92.

The embodiment shown in FIG. 10 is ideally suited for forming pieces or panels of predetermined size from a strip of material such as light gage steel extending from a coil where, due to the length of the strip, it is desirable to avoid wasting the material within the edge portion. The construction of the die plates 80 and 82 shown in FIG. 10 is also desirable for balancing the shearing forces acting laterally on the strip S' so that there is no tendency for the strip to shift laterally as it is being fed between the die plates by the rolls 87. Typically, the pre-cut panels may be used as blanks for drawing or forming baking pans and the like.

Figure 11:
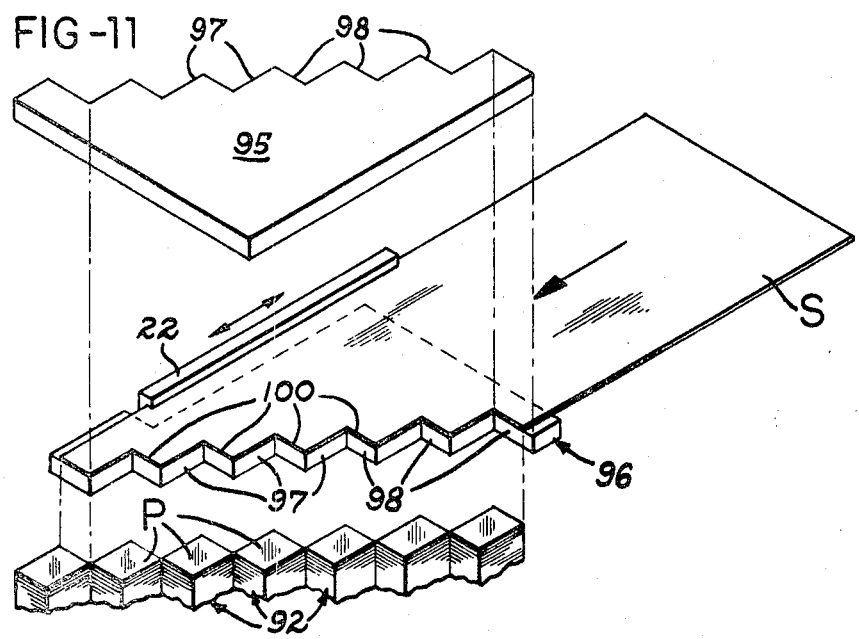
FIG. 11 is a diagrammatic perspective view of apparatus constructed in accordance with a modified form of the apparatus shown in FIG. 10.

FIG. 11 shows a somewhat modified form of the apparatus shown in FIG. 10, which may be used in place of the apparatus shown in FIGS. 7–9 for converting a rectangular sheet S of material into smaller pieces of predetermined size. The sheet is advanced in successive steps by the clamping jaws 22 of a feeding mechanism such as mentioned above. In this embodiment, however, the upper die member or plate 95 and lower die member or plate 96 are formed with mating longitudinally and laterally extending shearing surfaces 97 and 98 respectively, which are alternately connected to form a continuous step-like shear line extending diagonally or transversely across the full width of the sheet S. Thus the die plates form a series of generally aligned right angle notches 100 within the leading edge portion of the sheet to produce a corresponding series of rectangular pieces P which are collected in stacks 92.

It is to be understood that a progressive die set with corner punches may be used in either of the embodiments shown in FIGS. 10 and 11 for punching corresponding corner openings within the sheet prior to shearing to avoid cracking or splitting of the pieces at the corners especially when the die plates begin wearing at the corners. As mentioned above, the pre-punched corner openings are especially desirable for converting sheets of relatively brittle material into smaller pieces or for providing beveled corners on each piece.

From the drawings and the above description, it can be seen that the apparatus and process of the invention provide several desirable features and advantages. For example, the process and apparatus are especially suited for efficiently producing sample chips from a sheet of decorative laminate material while minimizing the forming of scrap material. That is, by successively perforating the sheets S to form rows of corner openings and then successively shearing the sheet S along longitudinally and laterally extending lines alternately connecting the openings, it has been found that chips can be formed with smooth beveled corners and smooth edges without splitting or cracking. It is to be understood, however, that the process and apparatus of the invention may be used for efficiently converting other sheets of material into smaller pieces whenever it is desired to produce a high volume of pieces of predetermined size with smooth edges and corners and to minimize the forming of scrap.

Another advantage or feature provided by the use of corner punches in advance of the shearing dies is the obtaining of a significantly longer die life for the shearing dies. For example, when a sheet of decorative laminate material is first perforated at locations corresponding to the corners of the chips, the square corners of the shearing dies 42, which usually wear more rapidly, are not used for forming the corners of the chips. Thus when the punch inserts 32 and 36 begin to wear, they may be easily replaced without requiring replacement of the shearing dies 42 and 44.

Still another feature is provided by the branding die 70, which effects permanent marking of each of the chips without requiring individual handling and marking of each chip after it is formed. Furthermore, the marks on each chip are always in precise registration and thereby eliminate the problem of misalignment which has previously been a difficulty associated with individual handling and marking the sample chips of decorative laminate material.

While the process and apparatus herein described constitute preferred embodiments of the invention, it is to be understood that the invention is not limited to these precise embodiments, and that changes may be made therein without departing from the scope of the invention.

What is claimed is:

1. A process for progressively converting brittle sheet material into a plurality of pieces of predetermined size and adapted to minimize the production of scrap material, comprising the steps of forming within the sheet longitudinally spaced rows of laterally spaced openings corresponding in location to the corners of the pieces, shearing with a set of die members an edge portion of the sheet solely along laterally and longitudinally extending lines alternately connecting said openings to form a series of natches along the edge portion of the sheet with each notch conforming to the configuration of a piece, and alternately advancing the sheet longitudinally in successive increments and repeating said shearing operation.

2. A process as defined in claim 1 wherein said rows of openings are successively punched within the sheet simultaneously and in spaced relationship with the successive shearing of the sheet along said lines connecting said openings for producing said pieces with a progressive die set.

3. A process as defined in claim 1 wherein said openings are generally square and diagonally orientated to provide beveled corners on each rectangular piece.

4. A process as defined in claim 1 including the step of progressively heating the material as it is advanced between said die members and immediately prior to shearing said edge portion along said lines.

5. A process as defined in claim 1 including the step of successively marking the sheet material at predetermined locations prior to shearing along said lines and while the sheet is in registration with said die members to provide precisely spaced and orientated identification marks on the sheet at locations corresponding to said pieces and thereby to avoid individual handling and marking of each piece after it is formed.

References Cited

UNITED STATES PATENTS

| | | | |
|---|---|---|---|
| 116,372 | 6/1871 | Thompson | 83—694 |
| 1,621,012 | 3/1927 | Head et al. | 83—694 X |
| 1,962,431 | 6/1934 | Daley | 83—43 X |
| 2,162,925 | 6/1939 | Weiss | 83—405 |
| 2,188,916 | 2/1940 | Murch | 83—44 X |
| 2,235,532 | 3/1941 | Reardon | 83—15 X |
| 2,586,383 | 2/1952 | Rieger | 83—683 X |
| 2,600,834 | 6/1952 | Blair | 83—43 X |
| 2,852,074 | 9/1958 | Wahl et al. | 83—405 X |
| 2,858,884 | 11/1958 | Duffield | 83—43 X |
| 3,131,425 | 5/1964 | Jacobs et al. | 83—405 X |

FOREIGN PATENTS 547,190   3/1932   Germany.

FRANK T. YOST, Primary Examiner

U.S. Cl. X.R.

83—41, 43, 44